United States Patent [19]

Kuhnert

[11] Patent Number: 4,892,070

[45] Date of Patent: Jan. 9, 1990

[54] TECHNIQUE AND SPARK PLUG TO IGNITE VERY LEAN FUEL AIR MIXTURES, PARTICULARY FOR GAS ENGINES

[76] Inventor: Dieter Kuhnert, Friedrich-Metz-Str. 18, 6920 Sinsheim, Fed. Rep. of Germany

[21] Appl. No.: 174,123

[22] Filed: Mar. 28, 1988

[30] Foreign Application Priority Data

Mar. 30, 1987 [DE] Fed. Rep. of Germany ....... 3709976

[51] Int. Cl.⁴ .......................... F02B 19/08; F02B 23/00
[52] U.S. Cl. ...................................... 123/274; 123/266
[58] Field of Search ............... 123/274, 275, 266, 267, 123/143 R, 144, DIG. 9, 260, 263, 255, 256, 281, 282, 283, 285

[56] References Cited

U.S. PATENT DOCUMENTS

| | | | |
|---|---|---|---|
| 4,061,114 | 12/1977 | Christopher | 123/266 |
| 4,072,134 | 2/1978 | Noguchi et al. | 123/274 |
| 4,072,136 | 2/1978 | Noguchi et al. | 123/274 |
| 4,465,031 | 8/1984 | Bamer et al. | 123/266 |
| 4,509,476 | 4/1985 | Breuser et al. | 123/266 |
| 4,542,724 | 9/1985 | Blais | 123/266 |

Primary Examiner—Raymond A. Nelli
Attorney, Agent, or Firm—McGlew & Tuttle

[57] ABSTRACT

A method and a spark plug construction to ignite very lean fuel air mixtures with the aid of an ignition chamber with separate ignition, which is arranged in the main combustion chamber of an internal combustion engine, connected to the main combustion chamber 20 through transfer channels 21. Transfer channels may be provided which proceed tangentially, whereby rich fuel air admixtures or additional fuel is brought, valve timed, to the area of at least one transfer channel 21 outside the ignition chamber through a supply channel 24. During a compression stroke the very lean mixture in the main combustion chamber is pressed into the ignition chamber 16 through the transfer channels, which results in a very good intermixing with the additional fuel or the admixture due to the turbulent movement through the transfer channels 21 and the long path to the spark gap. This guarantees a very safe ignition.

6 Claims, 4 Drawing Sheets

TECHNIQUE AND SPARK PLUG TO IGNITE VERY LEAN FUEL AIR MIXTURES, PARTICULARY FOR GAS ENGINES

FIELD OF THE INVENTION

1. Background Of The Invention

This invention concerns an apparatus and method to remotely ignite very lean fuel air mixtures, with the aid of an ignition chamber, which is arranged in a main combustion chamber of an internal combustion engine. The ignition chamber is connected to the main combustion chamber through transfer channels, preferably arranged tangentially, whereby rich fuel air admixture or additional fuel is brought into the ignition chamber through valve gears. The invention further concerns a spark plug construction suited to the above discussed procedure, particularly for gas engines, which is equipped with transfer channels, preferably arranged tangentially, leading to the main combustion chamber; it is further equipped with a valve controlled supply channel which brings in rich fuel air admixture or additional fuel.

It is known that in order to ignite fuel air mixtures leaned, respectively weakened with either air and/or exhaust gas, in internal combustion engines to utilize ignition chamber or turbulence chambers known as pre-combustion chambers. Systems with homogeneous loads which have proven themselves with medium excess air ratios are shown, for instance, in the U.S. Pat. No. 1,127,512 or the West German Pat. No. 29 16 285. To achieve ignition, the mixture is pressed from the main combustion chamber into the chamber equipped with a spark plug during the compression stroke.

It is known from the literature, that in order to ignite a mixture which has been leaned considerably, additional fuel or a rich fuel air mixture must be brought into the chamber according to a so-called stratified charge concept (for instance VDI-Z, Vol 18, 1976, p. 885 ff or from the periodical Automobil-Industrie 4, 1976, p. 23 ff.). These two well known procedures require an extravagant injection of a very small quantity, respectively an additional carburating unit with complicated valve gear control. In order to eliminate this expense, it was suggested in West German application No. 24 50 980, to use valves which are controlled independently through the chamber pressure.

The high thermic load on the valve which is connected to the pre-combustion chamber and controlled with the chamber pressure is a big disadvantage for the procedure as it is known, that very high temperatures occur in the pre-combustion chamber.

Another disadvantage lies in the face that the mixing of the additional fuel, respectively admixture which is being added into the pre-combustion chamber is either insufficient or too slow, which creates uneven ignition and, therefore, uneven power transformation in the main combustion chamber.

SUMMARY AND OBJECTS OF THE INVENTION

It is an object of the invention to develop a method as mentioned above, and to develop a spark plug construction which would be suitable to achieve the inventive method through which an improved mixing of the additional fuel or the admixture in the ignition chamber can be achieved, whereby the temperatures which occur in the supply channel would be lower when compared to temperatures which results from known procedures.

According to the invention, a solution is provided through a method whereby the admixture or the additional fuel is brought to the main combustion chamber into the outlet area of at least one transfer channel or directly into at least one transfer channel. Further, the solution is made possible by a spark plug for which at least one outlet of the supply channel was arranged outside the ignition chamber in the area of at least one transfer channel.

Due to the discharge of the additional fuel or the admixture directly in front of at least one transfer channel of the ignition chamber, this additional fuel, respectively the admixture is pressed into the ignition chamber through the transfer channel or channels during the compression stroke whereby a good intermixing with the extremely lean mixture of the main combustion chamber, as well as a homogeneous ignition mixture is achieved due to the extended flow path to the point of ignition and the turbulence created due to the narrow channels through which it has to flow. An Optimum mixture is achieved with transfer channels opening tangentially into an ignition chamber which is utilized as a swirl chamber. Another advantage is achieved in that during the combustion stroke only the very lean mixture of the main combustion is pressed into the supply channel which has a much lower temperature when compared to the mixture of a precombustion chamber. The valves, connections, grid structures, exit valves, etc. which can be found therein, are, therefore, exposed to a much lower range of temperatures. Therefore, these design components can be designed more simply as well as more cheaply both as far as construction and material are concerned and have a markedly improved life span.

Through the measures listed in the sub-claims, favorable developments and improvements of the techniques listed in claim 1 and of the spark plug described in claim 4 are possible.

It is advantageous to have the supply channel located lateral to the ignition chamber and to have it open before an outlet of a transfer channel or at least in a transfer channel. From these places, the additional fuel or the admixture can be brought into the ignition chamber easily and without major losses.

An automatic ball valve is a particularly well suited valve to control the input of the additional fuel or the admixture. This ball valve is arranged in the combustion chamber outlet and/or the outside outlet of the supply channel and/or externally connected to the supply channel. Therefore, one or more valves can be utilized, either singly or in multiples switched one after the other to increase safety and input accuracy. If utilized in that manner, a valve arranged in or at the outlet of the supply channel suffers a minimum temperature load. It is also possible to utilize an electronically controlled solenoid valve at the outside outlet of the supply channel or in the supply line to this outlet, through which an even more exact dosage is possible.

An automatic valve in the supply channel arranged in series in front of the solenoid valve prevents an overload of the dosage through the hot mixture.

In order to add the additional fuel of the admixture directly into at least one transfer channel, it is suitably connected via a connecting channel to a valve utilized as a 3/2 way valve which is arranged at the combustion chamber side outlet of the supply channel, whereby the supply channel is connected to the connecting channel in a first valve position with a largely closed combustion chamber side valve outlet and, in a second valve position, the supply channel is closed. Thus, it is technically easy to mount the valve which can be regulated by means of its larger cross section directly above the main combustion chamber.

If several transfer channels are utilized directly to improve the mixture and the supply of the additional fuel or admixture, it is practical to form a ring chamber in the plug housing and connect it at one side to the supply channels. A suitable flow result is achieved by shaping the transfer channels like a Venturi nozzle, because this results in additional suction action.

A nozzle-like discharge outlet of the supply channels main combustion chamber side prevents the additional fuel or the admixture from penetrating as a jet too far into the interior of the main combustion chamber. The nozzle-like discharge forms a supply gas cloud in front of an opening of at least one transfer channel due to the very fine spraying action. In this manner, a sufficiently rich mixture can be achieved in the ignition chamber with a minimum amount of added additional fuel or admixture.

It has further proven to be advantageous to at least partially equip the supply channel with instruments to let off heat. This is preferred to be a grid type texture or a bar equipped with longitudinal grooves and/or longitudinal channels with good heat conductivity. The hot mixture which might have been introduced into the supply channel may be cooled in that manner through these instruments conducting off heat so that a valve or similar item placed behind it is not exposed to too high a temperature. In addition, these instruments also act as a flame trap device.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
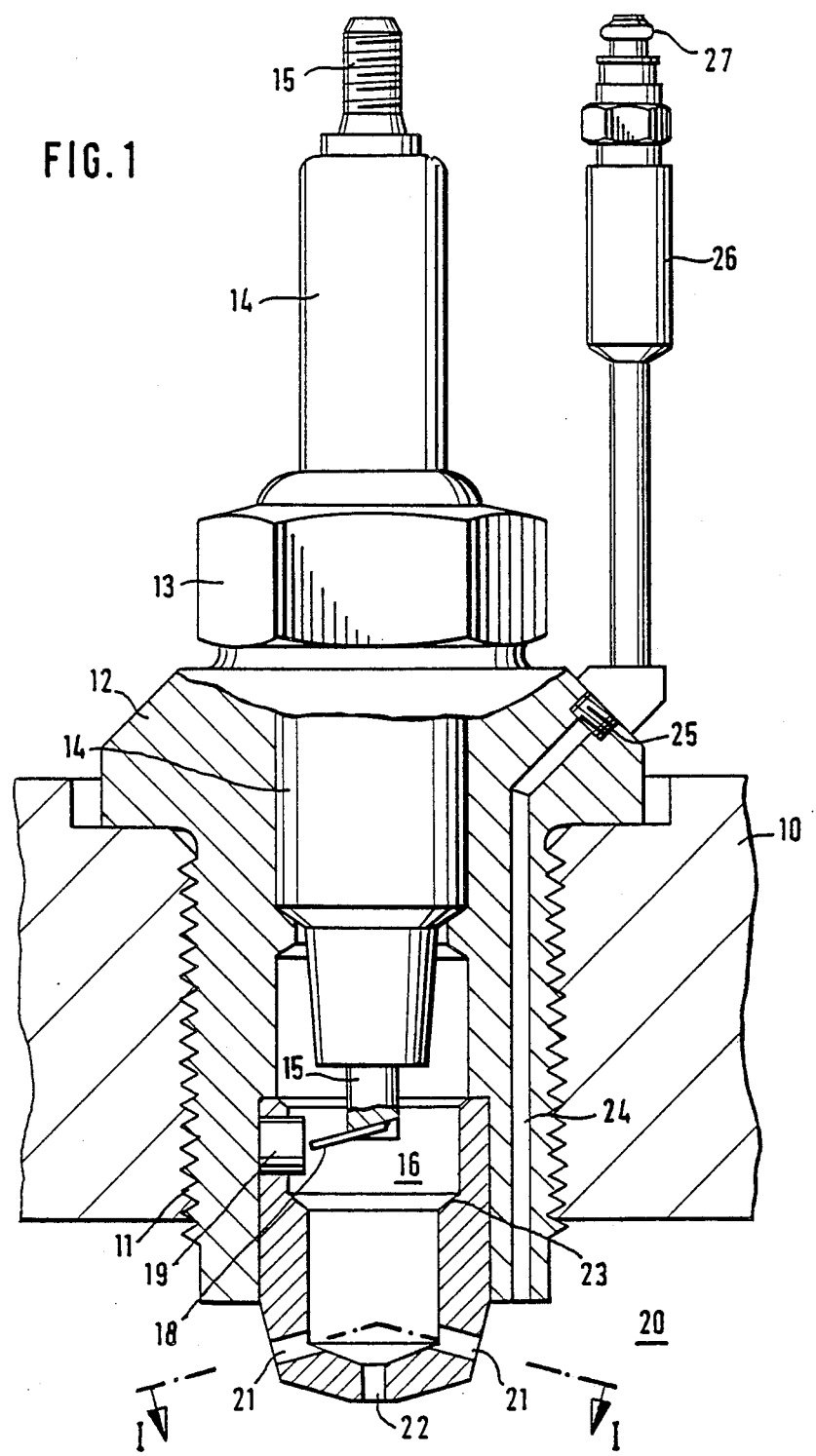
FIG. 1 is a partial sectional view of a spark plug with a valve arranged on the outside according to a first embodiment of the invention.

FIG. 1 shows a first embodiment of a spark plug construction screwed into the wall 10 of a cylinder head as is commonly known. The spark plug construction includes a housing 12 furnished with an external thread 11, which is shown schematically in the lower area of FIG. 1. In the upper area of this housing 12 the construction is shaped as a hexagon 13, in order to guarantee screwing in and out with a wrench. The spark plug body includes an insulating body 14 which is built into this housing 12 which, in turn, surrounds a bar shaped connecting electrode 15, packing and insulating it. Electrode 15 reaches as far as the ignition chamber 16. This ignition chamber 16 is formed through an ignition chamber housing 17 which is set into the housing 12 through an appropriate opening.

The chamber housing 17 is firmly connected to housing 12, above all screwed in, welded in, pressed in, etc. and extends partially at the bottom of the housing 12 of the spark plug. In the ignition chamber 16, the connecting electrode 15 is furnished with an ignition electrode 18 oriented laterally whereby a spark gap is formed between it and a suitable arranged counter electrode 19 of the ignition chamber housing 17. Naturally, this spark gap forming electrodes can be in another, equally suitable shape.

Figure 2:
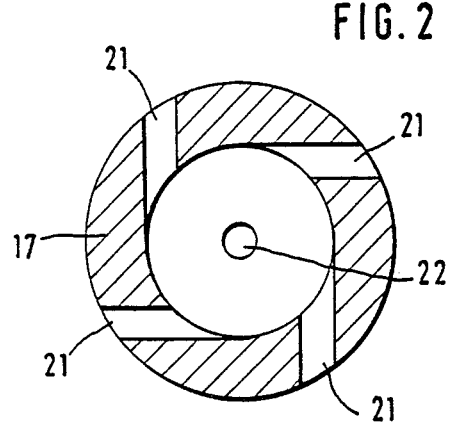
FIG. 2 is a horizontal view through the spark plug shown in FIG. 1, along the lines of intersection I—I.

As can be seen in connection with FIG. 2, the ignition chamber housing 17 in its lower area exhibits four transfer channels 21 which run diagonally downward to the main combustion chamber 20, exiting tangentially into the ignition chamber 16. In addition, it is equipped with an additional transfer channel 22 which progresses downward axially. In the upper area the ignition chamber housing 17 exhibits an enlarged step 23, whereby the spark gap is located in the extended area of the ignition chamber 16. This results in a particularly good flow pattern and a homogeneous mixture. However, more simply constructed ignition chambers could be used.

In order to simplify matters, the transfer channels 21 in FIG. 1 are shown in a way which is customary for a radial course. In spite of this, they do end tangentially in the ignition chamber 16 as shown in FIG. 2.

A supply channel 24 which is present in housing 12 of the spark plug ends on the combustion chamber side in the area directly before the opening of a transfer channel 21. It is equipped on the outside with a connection thread 25.

A valve body 26 is screwed into it, which on its opposite end, is equipped with a connecting nipple 27 for a connecting hose which is not shown. The valve body 26 can be equipped with either a valve which can be automatically pressure controlled or a solenoid valve. It is also possible to use an auto-regulated valve exclusively in the valve body 26, while a solenoid valve can be attached to its other end in the connecting hose at some further distance.

The mode of action of the design example shown in FIG. 1 consists of the fact that additional fuel or a rich fuel air admixture is added to the valve body 26 through its connecting nipple 27 under a particular pressure. In case of the preferred utilization in a gas engine, this consists of either a gas or a gas mixture. Of course, it can also be utilized for gasoline engines or diesel engines.

If only one auto-regulated valve is planned for valve body 26, a negative differential pressure is created between every two compression strokes through which the additional fuel or admixture can get to the main combustion chamber through the supply channel 24 while the valve is being opened. The amount necessary for this purpose is quite small, for instance less than 1% of the main fuel amount.

During the compression stroke which follows, the valve in valve body 26 closes and the additional fuel which comes into the main combustion chamber immediately in front of a transfer channel 21, is pressed via this transfer channel 21 into the ignition chamber 16. Due to its tangential entry, it results in turbulence and an excellent inter-mixing with the other, very lean fuel air mixture of the main combustion chamber is achieved. Since the path to the spark gap is quite long, a very homogeneous mixture with good ignition qualities is therefore present in the area of this spark gap, which, after successful ignition, gets to the main combustion chamber in an explosive fashion through the transfer channels 21, 22. It enters the main combustion chamber as highly heated gas jets or torch jets which there ignite the lean fuel air mixture.

Since the addition of additional fuel or admixture is necessary only immediately prior to a compression stroke, the input time interval can be optimized through a solenoid valve in or in front of the valve body 26. This can be closed through an ignition signal for instance, and can be kept in closed position based on a time interval dependent on the number of revolutions. A similar procedure is known from electronic gasoline injection. An alternative method might be to close the valve through an ignition signal for its assigned spark plug and to open it again through an ignition signal for the spark plug of another cylinder or through a crank shaft mark.

Figure 3:
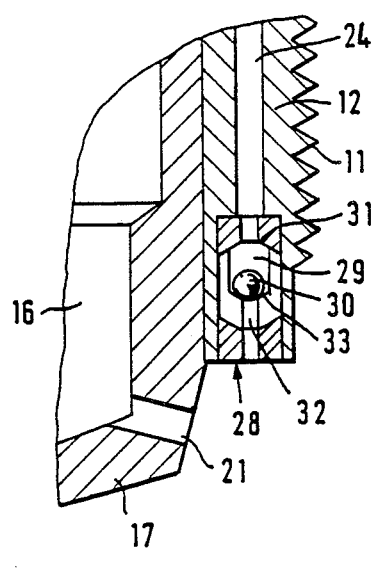
FIG. 3 is a partial cross sectional view of a spark plug construction with a valve arranged on an exit opening of the supply channel according to a second embodiment of the invention.

The second embodiment shown in FIG. 3, is shown with an auto regulated valve 28 on the chamber side outlet of supply channel 24. The spark plug, which is otherwise constructed in the same manner, is shown only partially. Corresponding construction units or areas are marked with identical numbers. The valve 28 is housed in the enlarged outlet of the supply channel 24, for instance pressed in or screwed in. A freely movable, spherically shaped valve element 30 is placed in a valve chamber 29. If the pressure in the main combustion chamber surpasses the pressure of the additional fuel, this valve element 30 is pressed against the upper valve seat 31, thus preventing invasion of the hot mixture from the main combustion chamber into the supply channel 24.

If pressure conditions are reversed, the valve element 30 is placed against the lower outlet 32 which is located opposite the valve seat 31, whereby additional fuel or admixture can pass by the valve element 30 through by-pass grooves 33. By-pass channels in the valve housing can be used instead of the by-pass grooves 33.

Figure 4:
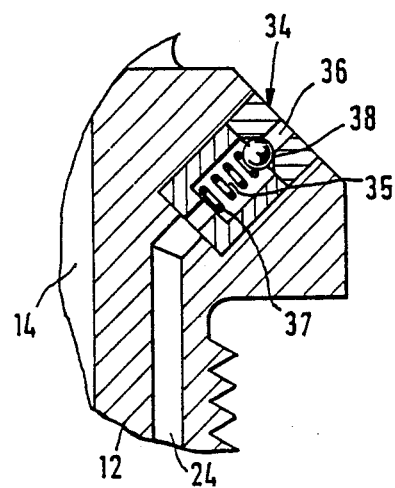
FIG. 4 is a partial cross sectional view of a spark plug construction with a valve arranged at the entrance opening of the supply channel according to a third embodiment of the invention.

The third embodiment shown in FIG. 4 is equipped with an auto regulated valve 34 attached to the outside end of the supply channel 24 in the housing 12 of the spark plug. In its turn, this valve is equipped with a special valve element 38 arranged in a valve chamber 35 which is pressed against a valve seat 36 found on the outside end with the aid of a spring 37.

The pressure of the mixture present in the main combustion chamber pushes the valve element 38 in the direction of the spring power. If pressure in the main combustion chamber is low, the valve element 38 is lifted off the valve seat 36 against the pressure of the spring 37 due to the pressure of the additional fuel or admixture, which creates a passage through the valve 34.

Because of the more temperature sensitive spring 37, an arrangement of the valve 34 on the outside end of the supply channel 24 is planned. Basically, the mounting location of valves 28 and 34 can be exchanged freely, whereby valves such as these can also be placed in the valve body 26. Of course, just one such valve 28, respectively 34 is sufficient, however, it is possible to switch several valves in series, for instance as shown in FIGS. 3 and 4, valve 28 at the combustion chamber side opening and valve 34 at the outside opening of supply channel 24. In addition, in all cases, an additional solenoid valve can additionally be switched in series.

Figure 5:
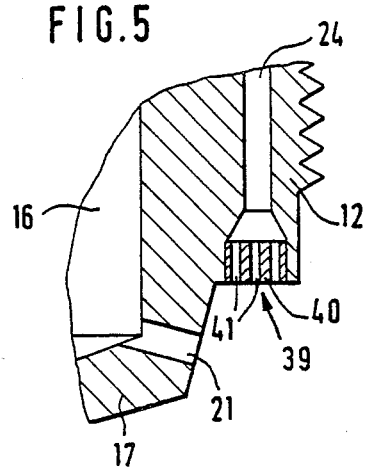
FIG. 5 is a partial cross sectional view of a nozzle-like discharge outlet on the supply channel.
Figure 6:
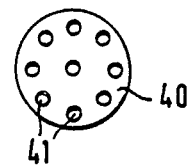
FIG. 6 is a horizontal cross-sectional view through the discharge outlet shown in FIG. 5.

According to FIG. 5, the combustion chamber side outlet of the supply channel 24 can be equipped with nozzle-like discharge opening 39. In this instance, a disc, respective cylinder-shaped outlet part 40 is set into the enlarged outlet of the supply channel 24. It is either pressed or screwed in and, as shown in FIG. 6, it exhibits a number of axial channels 41, which are shaped as axial borings.

This prevents an exiting jet emerging from supply channel 24 which is too hard or which might reach too far. The additional fuel or admixture exists through this outlet opening in a fine spray, broadly distributed and distributes itself in front of the outlet of the assigned transfer channel 21.

Figure 7:
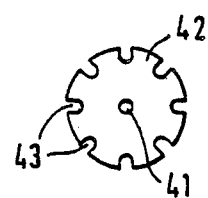
FIG. 7 is a horizontal cross-sectional view of an alternative design of the discharge opening shown in FIG. 6.
Figure 8:
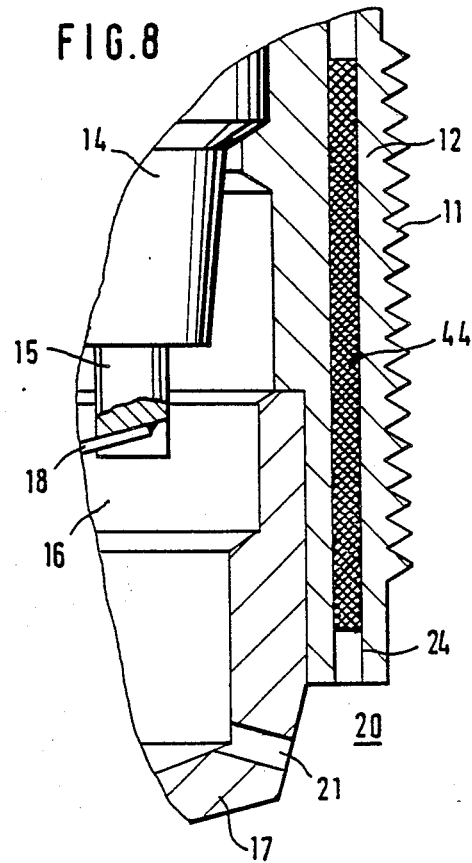
FIG. 8, is a partial cross sectional view of a spark plug construction with a grid type texture in the supply channel.
Figure 9:
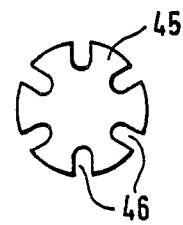
FIG. 9 is a horizontal cross sectional view through a bar in the supply channel furnished with longitudinal grooves in order to let off heat.

As shown in FIG. 7, outside longitudinal grooves 43 can be used as channels for an outlet opening 42 in an alternate design. FIG. 8 shows an area of the supply channel 24 in a partial cross section into which a grid texture 44 with good heat conductivity was set. Instead of a grid texture, webbed structures or other structures with narrow through-passage openings may be used as well, for instance, a bar 45 with outside longitudinal grooves 46. A cross section of such a design as shown in FIG. 9

Such devices serve for better heat release of hot exhaust gases or mixtures which might have been pressed into the supply channel 24. On the one hand, they provide better protection of a valve located on the outside end of supply channel 24, and at the same time, provide excellent security against flame flash-back.

Figure 10:
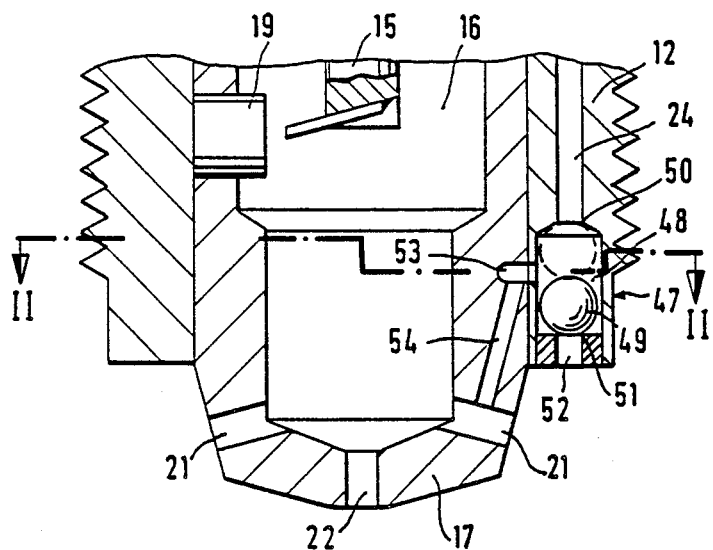
FIG. 10 is a partial cross sectional view of a spark plug construction with an outlet of the supply channel in a transfer channel.
Figure 11:
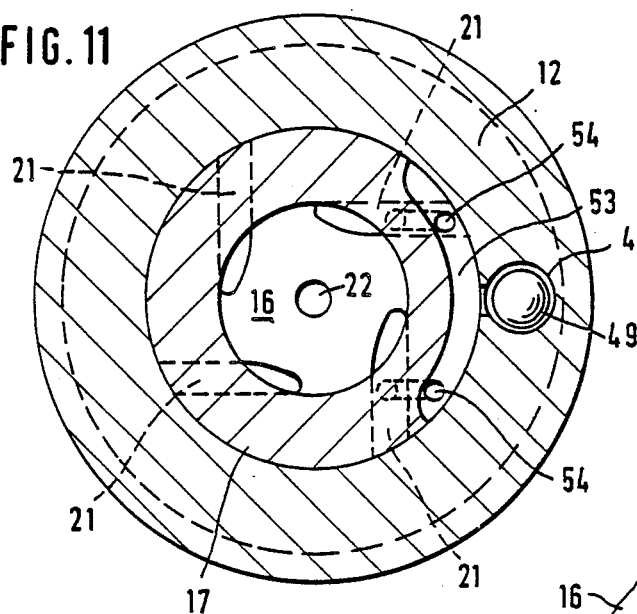
FIG. 11 is a horizontal cross sectional view through the spark plug construction shown in FIG. 10 taken along the line of intersection II—II in the direction of the arrows; and, FIG. 12 is a partial cross sectional view of transfer channel in the shape of a Venturi nozzle of the embodiment of FIG. 10.

The embodiment shown in FIGS. 10 and 11 are again equipped with a valve 47 at the combustion chamber side opening of the supply channel 24. A freely movable spherical valve body 49 is mounted in its valve chamber 48. This valve element has an upper valve seat 50 which prevents invasion by gases into the supply channel 24 from the combustion chamber, and a lower valve seat 51 which prevents invasion by additional fuel or admixtures of the main combustion chamber. The lower valve seat 51 is equipped with an opening 52 to the main combustion chamber which means that the valve can be operated from the main combustion chamber pressure through this opening 52.

In its approximate center area, the valve chamber 48 is connected to a ring chamber 53 which partly passes through housing 12 and partly through the ignition chamber housing 17 and which extends over an angle of approximately 90°. Two connecting channels 54 pass from this ring chamber 53 to two transfer channels 21. They end in their approximate center areas. This enables the direct addition of additional fuel or admixture into the transfer channels 21 which, during the compression stroke, in then pressed through the lean mixture into the ignition chamber 16 and inter-mixed. In this manner additional fuel of admixture can be added directly into bypass channels 21. The valve control continues through the pressure in the main combustion chamber.

In a simplified design version in a change from the example shown, the valve chamber 48 can be connected with a transfer channel 21 through only one connecting channel 54. The ring chamber 53 can also extend over a larger angle area so that additional connection channels 54 for additional transfer channels 21 can be planned.

Figure 12:
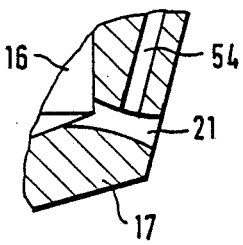

It has proven to be particularly advantageous to construct the transfer channels 21 in the manner of a Venturi nozzle as shown in FIG. 12. Here remaining additional fuel or admixture is sucked out of the connecting channel 54 connected to its most narrow part while a very lean mixture is flowing through the transfer channel. Another result is an even better mixing action.

Even if additional fuel or admixture is added directly into the main combustion chamber in front of the outlets or transfer channels 21, a similar design with a ring chamber in housing 12 can be planned, whereby one single supply channel 24 opens into this ring channel from the outside and, from this ring channel, several continuing supply channels open out in front of the outlets of the transfer channels 21 in the main combustion chamber.

While specific embodiments of the invention have been shown and described in detail to illustrate the application of the principles of the invention, it will be understood that the invention may be embodied otherwise without departing from such principles.

I claim:

1. A spark plug construction for use in an opening of a combustion cylinder defining a main combustion chamber comprising: a connecting electrode; an insulating body surrounding said connecting electrode; a housing connected to said insulating body and surrounding said insulating body; an ignition chamber housing connected to said housing defining an ignition chamber, said connecting electrode having an end extending into said ignition chamber, said ignition chamber housing defining transfer channels providing fluid communication between the main combustion chamber and said ignition chamber; an ignition electrode connected to said connecting electrode, said ignition electrode being positioned in said ignition chamber; a counter electrode connected to said ignition chamber housing, said counter electrode cooperating with said ignition electrode to form a spark gap between said ignition electrode and said counter electrode; admixture line means defined by said housing for providing an admixture from outside the cylinder to one of a space in said main combustion chamber adjacent one of said transfer channels and directly to one of said transfer channels intermediate said ignition chamber and the main combustion chamber, said admixture line means having at least one valve, said valve includes control means for opening and closing said valve in response to the pressure of the admixture in said admixture line means and in response to the pressure in said main combustion chamber, said valve is positioned at an outlet of said admixture line means adjacent said combustion chamber.

2. A spark plug construction according to claim 1, wherein: at least one transfer channel is connected to a valve chamber of said valve in said supply channel by a connecting channel, said connecting channel being in fluid communication with said supply channel in a first valve position and being out of communication with said supply channel in a second valve position.

3. A spark plug construction according to claim 2, wherein: said valve includes a valve body positioned within said valve chamber, said valve chamber including a first valve seat on a upstream side of said supply channel and a second valve seat adjacent said combustion chamber, said valve body being adapted to lie on one of said first and second valve seats, said connecting channel opening into said valve chamber intermediate said first and second valve seat.

4. A spark plug construction according to claim 2, wherein: a ring chamber is provided in one of said ignition chamber housing or said housing providing communication between said valve chamber and two connecting channels, each connecting channel connecting with a corresponding transfer channel.

5. A spark plug construction according to claim 2, wherein: said transfer channel connected to said connection channel is of a Venturi nozzle shape.

6. A spark plug construction for use in an opening of combustion cylinder defining a main combustion chamber comprising: a connecting electrode; an insulating body surrounding said connecting electrode; a housing connected to said insulating body and surrounding said insulating body; an ignition chamber housing connected to said housing defining an ignition chamber, said connecting electrode having an end extending into said ignition chamber, said ignition chamber housing defining transfer channels providing fluid communication between the main combustion chamber and said ignition chamber; an ignition electrode connected to said connecting electrode, said ignition electrode being positioned in said ignition chamber; a counter electrode connected to said ignition chamber housing, said counter electrode cooperating with said ignition electrode to form a spark gap between said ignition electrode and said counter electrode; admixture line means defined by said housing for providing an admixture from outside the cylinder to one of a space in said main combustion chamber adjacent one of said transfer channels and directly to one of said transfer channels intermediate said ignition chamber and the main combustion chamber, said admixture line means having at least one valve, said valve is positioned at an outlet of said admixture line means adjacent said combustion chamber.

* * * * *